(12) United States Patent
Roberge et al.

(10) Patent No.: US 10,337,645 B2
(45) Date of Patent: Jul. 2, 2019

(54) SEED GATE ASSEMBLY FOR AN AGRICULTURAL PRODUCT DISTRIBUTION SYSTEM

(71) Applicant: CNH Industrial Canada, Ltd., Saskatoon (CA)

(72) Inventors: Martin J. Roberge, Saskatoon (CA); Darwin L. Zacharias, Saskatoon (CA)

(73) Assignee: CNH Industrial Canada, Ltd., Saskatoon, Saskatchewan (CA)

(*) Notice: Subject to any disclaimer, the term of this patent is extended or adjusted under 35 U.S.C. 154(b) by 651 days.

(21) Appl. No.: 14/932,030

(22) Filed: Nov. 4, 2015

(65) Prior Publication Data

US 2016/0121284 A1 May 5, 2016

Related U.S. Application Data

(60) Provisional application No. 62/074,826, filed on Nov. 4, 2014.

(51) Int. Cl.

| F16K 31/00 | (2006.01) |
|---|---|
| A01C 7/00 | (2006.01) |
| F16K 31/60 | (2006.01) |
| A01C 7/12 | (2006.01) |
| A01C 15/00 | (2006.01) |
| A01C 7/10 | (2006.01) |

(52) U.S. Cl.
CPC ............ *F16K 31/602* (2013.01); *A01C 7/125* (2013.01); *A01C 15/007* (2013.01); *A01C 7/105* (2013.01)

(58) Field of Classification Search
CPC ..... F16K 31/602; A01C 7/125; A01C 15/007; A01C 7/105

USPC .................................................. 366/192, 193
See application file for complete search history.

(56) References Cited

U.S. PATENT DOCUMENTS

| 3,122,283 | A | | 2/1964 | Walters |
|---|---|---|---|---|
| 3,189,230 | A | | 6/1965 | Gillespie |
| 3,976,030 | A | | 6/1976 | Ragsdale et al. |
| 4,010,778 | A | | 3/1977 | Aggen et al. |
| 4,159,064 | A | | 6/1979 | Hood et al. |
| 4,408,704 | A | * | 10/1983 | Steilen ............ A01C 7/123 111/177 |
| 4,450,979 | A | | 5/1984 | Deckler |
| 4,503,803 | A | | 3/1985 | Barnes |
| 5,592,889 | A | | 1/1997 | Bourgault |

(Continued)

OTHER PUBLICATIONS

U.S. Appl. No. 14/932,082, filed Nov. 4, 2015, Martin J. Roberge.

*Primary Examiner* — Anshu Bhatia
(74) *Attorney, Agent, or Firm* — Rebecca L. Henkel; Rickard K. DeMille

(57) ABSTRACT

One embodiment describes a seed gate assembly disposed between a seed storage tank and a seed meter. The seed gate assembly includes a gate barrier that controls seed flow from the seed storage tank into the seed meter by moving to an open position that enables seed flow from the storage tank into the seed meter and by moving to a closed position that blocks seed flow from the storage tank into the seed meter; and a first seed agitator extending substantially perpendicularly from a surface of the gate barrier, in which the first seed agitator extends into the seed storage tank as the gate barrier moves toward the closed position to dislodge clumped seeds in the seed storage tank.

16 Claims, 7 Drawing Sheets

(56) References Cited

U.S. PATENT DOCUMENTS

| | | |
|---|---|---|
| 5,915,312 A | 6/1999 | Meyer et al. |
| 5,980,163 A | 11/1999 | Gregor et al. |
| 6,274,190 B1 | 8/2001 | Long, Jr. et al. |
| 6,298,797 B1 | 10/2001 | Mayerle et al. |
| 6,499,413 B2 | 12/2002 | Kleinknecht et al. |
| 6,520,111 B2 | 2/2003 | Lang |
| 6,688,244 B1 | 2/2004 | Meyer et al. |
| 6,935,256 B1 | 8/2005 | Meyer et al. |
| 7,104,207 B2 | 9/2006 | Wake et al. |
| 7,213,525 B2 | 5/2007 | Meyer et al. |
| 7,765,943 B2 | 8/2010 | Landphair et al. |
| 8,001,915 B2 | 8/2011 | Friggstad |
| 8,371,238 B2 | 2/2013 | Dean et al. |
| 8,672,173 B2 | 3/2014 | Hall et al. |
| 8,683,930 B2 | 4/2014 | Cresswell et al. |
| 8,701,575 B2 | 4/2014 | Friggstad |
| 8,714,344 B2 | 5/2014 | Kowalchuk et al. |
| 8,733,257 B2 | 5/2014 | Beaujot et al. |
| 8,800,458 B1 | 8/2014 | Wilhelmi et al. |
| 2006/0120836 A1 | 6/2006 | Cresswell et al. |
| 2012/0298022 A1 | 11/2012 | Bowen |
| 2012/0325130 A1* | 12/2012 | Kowalchuk .............. A01C 7/08 111/176 |
| 2013/0247803 A1 | 9/2013 | Heintzman |
| 2014/0190584 A1 | 7/2014 | Johnson et al. |
| 2014/0208999 A1 | 7/2014 | Henry |

* cited by examiner

SEED GATE ASSEMBLY FOR AN AGRICULTURAL PRODUCT DISTRIBUTION SYSTEM

CROSS-REFERENCE TO RELATED APPLICATION

This application claims priority from and the benefit of U.S. Provisional Application Ser. No. 62/074,826, entitled "SEED GATE ASSEMBLY FOR AN AGRICULTURAL PRODUCT DISTRIBUTION SYSTEM", filed Nov. 4, 2014, which is hereby incorporated by reference in its entirety.

BACKGROUND

The present disclosure relates generally to seed planting systems and, more particularly, to seed metering in the seed planting system.

Generally, a seed planting system is used to deposit seeds into the soil. For example, in the seed planting system, the seeds may be centrally stored in an air cart and distributed to an agricultural implement. The agricultural implement typically includes multiple rows of ground engaging opener assemblies that excavate trenches into soil for depositing seeds. In this manner, the seed planting system may deposit rows of seeds into the soil.

In fact, the deposition of seeds (e.g., spacing and amount) into the soil may be controlled by controlling the distribution of seeds to the agricultural implement. More specifically, the distribution of seeds to each of the ground engaging opener assemblies may be controlled by a seed meter on the air cart. However, during operation, seeds may clump in the air cart or components in the seed meter may be replaced.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

A first embodiment describes a seed gate assembly disposed between a seed storage tank and a seed meter. The seed gate assembly includes a gate barrier that controls seed flow from the seed storage tank into the seed meter by moving to an open position that enables seed flow from the storage tank into the seed meter and by moving to a closed position that blocks seed flow from the storage tank into the seed meter; and a first seed agitator extending substantially perpendicularly from a surface of the gate barrier, in which the first seed agitator extends into the seed storage tank as the gate barrier moves toward the closed position to dislodge clumped seeds in the seed storage tank.

A second embodiment describes a seed gate assembly disposed between a seed storage tank and a seed meter. The seed gate assembly includes a gate barrier that controls seed flow from the seed storage tank into the seed meter by moving to an open position that enables seed flow from the storage tank into the seed meter and by moving to a closed position that blocks seed flow from the storage tank into the seed meter; and a lever that moves the gate barrier between the open position and the closed position. The lever includes a gate connector coupled to the gate barrier; a handle that enables actuation of the lever; and a linkage coupled between the gate connector and the handle, in which the linkage self-locks the seed gate assembly while the gate barrier is in the closed position by rotating to an over-center position relative to the gate connector and the handle.

A third embodiment describes a method for dislodging clumped seeds in a seed storage tank that includes determining a seed flow rate through a seed gate assembly to a seed meter using at least one sensor, in which the seed gate assembly is disposed between the seed storage tank and the seed meter; detecting clumped seeds in the seed storage tank based on the seed flow; and closing a gate barrier of the seed gate assembly such that a plurality of seed agitators extending substantially perpendicularly from a surface of the gate barrier extends into the seed storage tank to dislodge the clumped seeds.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
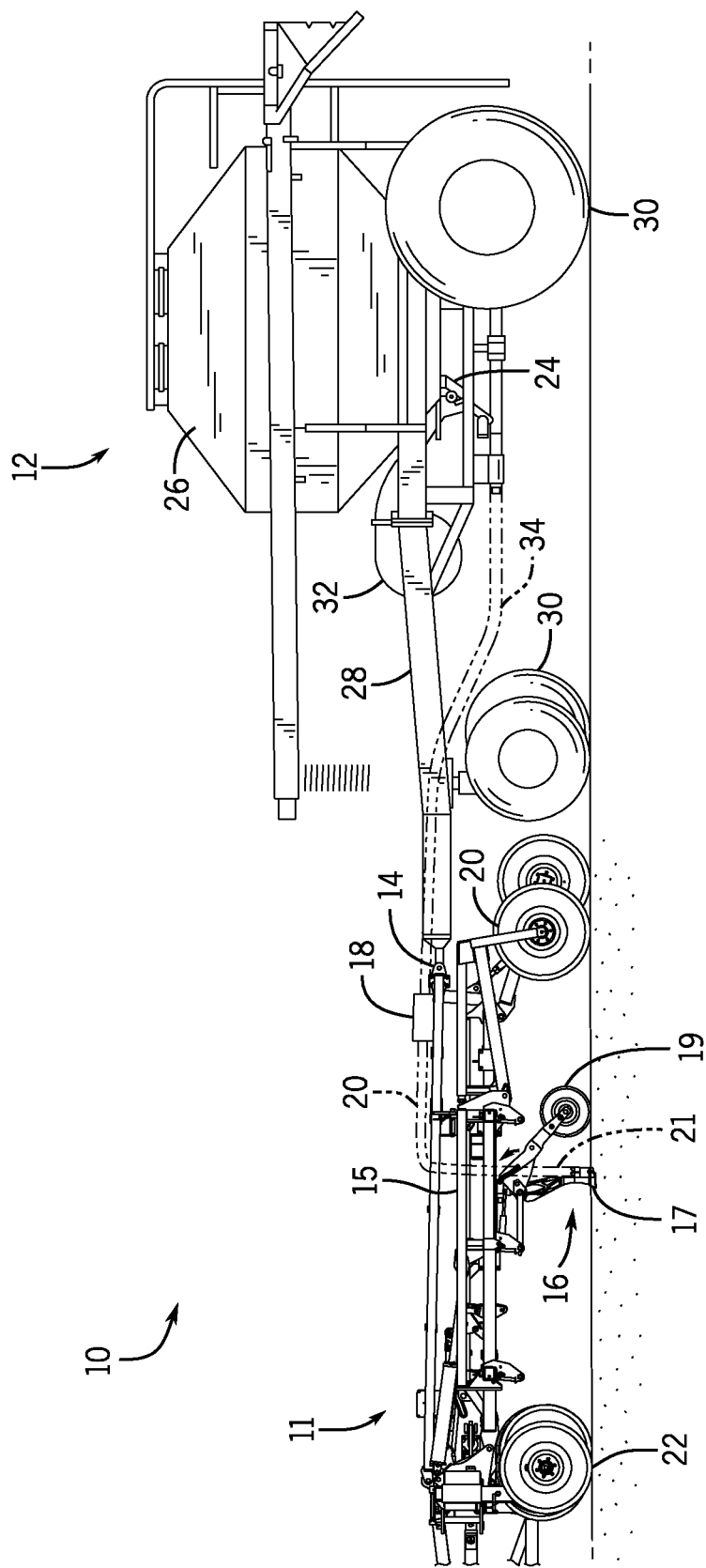
FIG. 1 is a side view of a seed planting system with an agricultural implement and an air cart, in accordance with an embodiment.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

A planting system generally enables rows of seeds to be deposited into soil. For example, to control the deposition of seeds, the seeds may be distributed from a centralized location, such as an air cart, to multiple rows of ground engaging opener assemblies on an agricultural implement. Each of the ground engaging opener assemblies may engage the soil to excavate a trench, in which the received seeds are deposited.

In certain configurations, the ground engaging opener assemblies do not include adjustable control over the rate of seed deposition. Instead, each ground engaging opener assembly may receive seeds, for example, via a pneumatic flow through hose. The ground engaging opener assembly may then utilize gravity to deposit received seeds into a trench. In other words, the ground engaging opener assembly may deposit seeds based on the flow rate of seeds to the ground engaging opener assembly, among other factors.

As such, the deposition of seeds into the ground may be controlled by the distribution of seeds to each of the ground engaging opener assemblies. In some embodiments, controlling the flow of seeds may enable the seed spacing and/or amount of seeds deposited to be controlled. For example, by decreasing the distribution rate of seeds to a ground engaging opener, the seed spacing may be increased and/or amount of seeds deposited may be reduced. On the other hand, by increasing the distribution rate of seeds to a ground engaging opener, the seed spacing may be reduced and/or amount of seeds deposited may be increased.

Generally, the seeds may be stored in a centralized location, such as an air cart, before being distributed to each of the ground engaging opener assemblies. Accordingly, a seed meter at the air cart may be utilized to control seed distribution from the centralized location to each of the ground engaging opener assemblies. In this manner, the seed meter may control the seed deposition of each of the ground engaging opener assemblies.

In some embodiments, the seeds may be pneumatically distributed. For example, the seeds may be entrained into an air stream, which is guided to the ground engaging opener assemblies. More specifically, the seed meter may use meter rollers to control the amount of seeds output into the air stream to control the amount of seeds supplied to the ground engaging openers. However, at times it may be desirable to perform maintenance on the air cart, and particularly the seed meter. For example, it may be desirable to replace a meter roller or to dislodge clumped seeds in the storage tank.

Accordingly, as will be described in more detail below, the techniques described herein improve the ability to perform maintenance on an air cart. In one embodiment, a seed meter is fluidly coupled to a storage tank to enable the seed meter to control seed distribution from the storage tank to ground engaging opener assemblies on an agricultural implement. More specifically, the seed meter may include a seed gate assembly, which may be opened to enable seeds to flow from the storage tank into the seed meter and closed to block seeds from flowing from the storage tank into the seed meter. As such, the seed gate assembly may be closed to provide improved accessibility to the seed meter by blocking additional seeds from flowing into the seed meter.

Additionally, the seed gate assembly may include a seed agitator, which may be used to dislodge clumped seed in the storage tank. In some embodiments, the seed agitator may extend substantially perpendicularly from a surface of a gate barrier of the seed gate assembly. Thus, when the gate barrier moves from the open position to the closed position, the seed agitator may extend into the storage tank. In this manner, the seed agitator may dislodge clumped seeds near the output of the storage tank.

To help illustrate, a side view of a planting system 10 is shown in FIG. 1. As depicted, the planting system 10 includes an agricultural implement 11 coupled to an air cart 12. In the depicted embodiment, the air cart 12 is towed behind the agricultural implement 11. More specifically, the agricultural implement 11 may be coupled to an off-road work vehicle by a first hitch assembly (not shown), and the air cart 12 may be coupled to the agricultural implement 11 by a second hitch assembly 14. However, in other embodiments, the agricultural implement 11 may be towed behind the air cart 12. In further embodiments, the implement 11 and the air cart 12 may be part of a single unit that is towed behind an off-road work vehicle or may be elements of a self-propelled vehicle.

As described above, the agricultural implement 11 may be used to deposit rows of seeds into the soil as the agricultural implement 11 is towed across a field by an off-road work vehicle, such as a tractor. Accordingly, as depicted, the agricultural implement 11 includes a tool frame 15 coupled to a ground engaging opener assembly 16, a distribution header 18, a hose 20, and wheel assemblies 22.

More specifically, the wheel assemblies 22 may contact the soil surface to enable the agricultural implement 11 to be pulled by the off-road work vehicle. As the agricultural implement 11 is pulled, a row of product may be deposited into the soil by the ground engaging opener assembly 16. Although only one ground engaging opener assembly 16 is shown, the agricultural implement 11 may include multiple ground engaging opener assemblies 16 organized in a row across the agricultural implement 11. In some embodiments, the agricultural implement 11 may include a row of 12, 14, 16, 18, 20, or more ground engaging opener assemblies 16, which may each deposit a row of seeds.

To facilitate depositing seeds, each ground engaging opener assembly 16 includes an opener 17, a press wheel 19, and a seed tube 21. More specifically, when the opener 17 engages the soil, the opener 17 may exert a downward force that excavates a trench into the soil as the ground engaging opener assembly 16 travels through the field. Seeds may then be deposited into the excavated trench via the seed tube 21. Then, the press wheel 19 may move the excavated soil into the trench to cover the seeds.

As described above, the air cart 12 may centrally store seeds and distribute the seeds to the ground engaging opener assembly 16. Accordingly, as depicted, the air cart 12 includes seed meter 24, a storage tank 26, a frame 28, wheels 30, and an air source 32. In the depicted embodiment, the air cart frame 28 is coupled to the tool frame 15 via the hitch 14. As such, the wheels 30 may contact the soil surface to enable the air cart 12 to be towed along with the agricultural implement 11.

Additionally, the storage tank 26 may centrally store the seeds for distribution. In some embodiments, the storage tank 26 may include multiple compartments for storing different types of granular products. For example, a first compartment may store seeds while a second compartment may store a dry fertilizer. In such configurations, the air cart 12 may deliver both seed and fertilizer to the implement 10 via separate distribution systems, or as a mixture through a single distribution system.

Generally, the distribution system may control the amount of seeds distributed to the ground engaging opener assemblies 16, for example, using the seed meter 24. As depicted, the seed meter 24 is mounted to the bottom of the storage tank 26. Accordingly, seeds may be fed from the storage tank 26 into the seed meter 24, which distributes the seeds to the distribution header 18 via a respective hose 34. The distribution headers 18 may then distribute the seeds to one or more ground engaging opener assemblies 16 via the hose 20. In this manner, the seed meter 24 may control distribution of seeds from the storage tank 26 to the ground engaging opener assemblies 16 and into the trenches to deposit rows of seeds into the soil.

Figure 2:
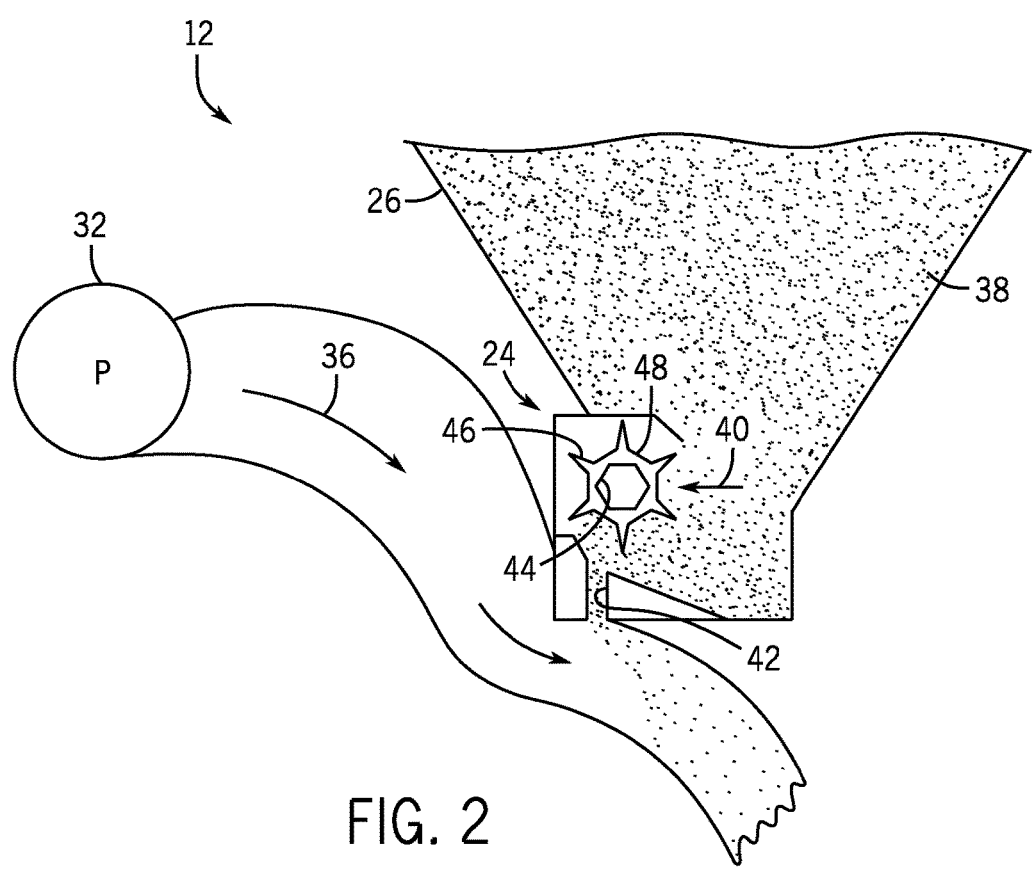
FIG. 2 is a schematic view of a seed meter, in accordance with an embodiment.

In some embodiments, the seed meter 24 may pneumatically distribute seeds. To help illustrate, a schematic view of the seed meter 24 is shown in FIG. 2. As depicted, the air source 32 generates an air stream 36, which is guided through though the seed meter 24. In some embodiments, the air source 32 may be a pump or blower powered by an electric or hydraulic motor, for example. As depicted, the air stream 36 is guided so that it tangentially engages seeds 38 output from the storage tank 26. In this manner, the seeds 38 may be entrained in the air stream 36 and output from the seed meter 24.

Thus, the seed meter 24 may control the flow rate of seeds 38 by controlling the flow of seeds from the storage tank 26 into the air stream 36. In the depicted embodiment, a meter roller 40 is utilized. More specifically, rotation of the meter roller 40 may transfer seeds 38 through an opening 42 into the air stream 36. Thus, as depicted, the meter roller 40 includes an interior cavity 44 that receives a shaft connected to a drive unit, which actuates the meter roller 40. In other embodiments, the meter roller 40 may be coupled to a wheel 30 so that rotation of the wheel 30 drives the meter roller 40 to rotate. Such a configuration may automatically vary the rotation rate of the meter roller 40 based on the speed of the air cart 12.

Additionally, as depicted, the meter roller 40 includes multiple flutes 46 and recesses 48. More specifically, seeds 28 may be held between adjacent flutes 46 in each recess 48. Thus, as the meter roller 40 rotates, gravity may pull the seeds 38 held in a recess 48 through the opening 42 and into the air stream 36. Generally, the number and geometry of the flutes 46 may be based on the seeds 38 being distributed. For example, a meter roller 40 having deeper recesses 48 and fewer flutes 46 may be employed for larger seeds, while a meter roller 40 having shallower recesses 48 and more flutes 46 may be employed for smaller seeds. Other parameters such as flute pitch (i.e., angle relative to a longitudinal axis) and flute angle (i.e., angle relative to a radial axis) may also be particularly selected based on seed type, for example.

In this manner, the seed meter 24 may control the rate at which seeds are distributed. As described above, multiple rows of ground engaging opener assemblies 16 may be used. Accordingly, in some embodiments, the seed meter 24 may include a single continuous meter roller 40. In such an embodiment, the seed distribution to each of the ground engaging opener assemblies 16 supplied by the seed meter 24 may be generally uniform.

However, in other embodiments, it may be beneficial to vary distribution rates to the ground engaging opener assemblies 16. For example, when the agricultural implement 11 is turning, ground engaging opener assemblies 16 closer to the center point of the turning circle may travel a shorter distance than ground engaging opener assemblies 16 further from the center point. Accordingly, to maintain uniform spacing of seeds between the rows, it may be desirable for the ground engaging opener assemblies 16 closer to the center point to deposit seeds at a slower rate than the ground engaging opener assemblies 16 farther from the center point. In such embodiments, the seed meter 24 may include multiple meter rollers 40 disposed adjacent to one another. For example, each individual meter roller 40 may be used to control seed distribution to one or more of the ground engaging opener assemblies 16. Accordingly, the seed meter 24 may include 4, 5, 6, 7, 8, 9, or more independently controllable meter rollers 40.

Figure 3:
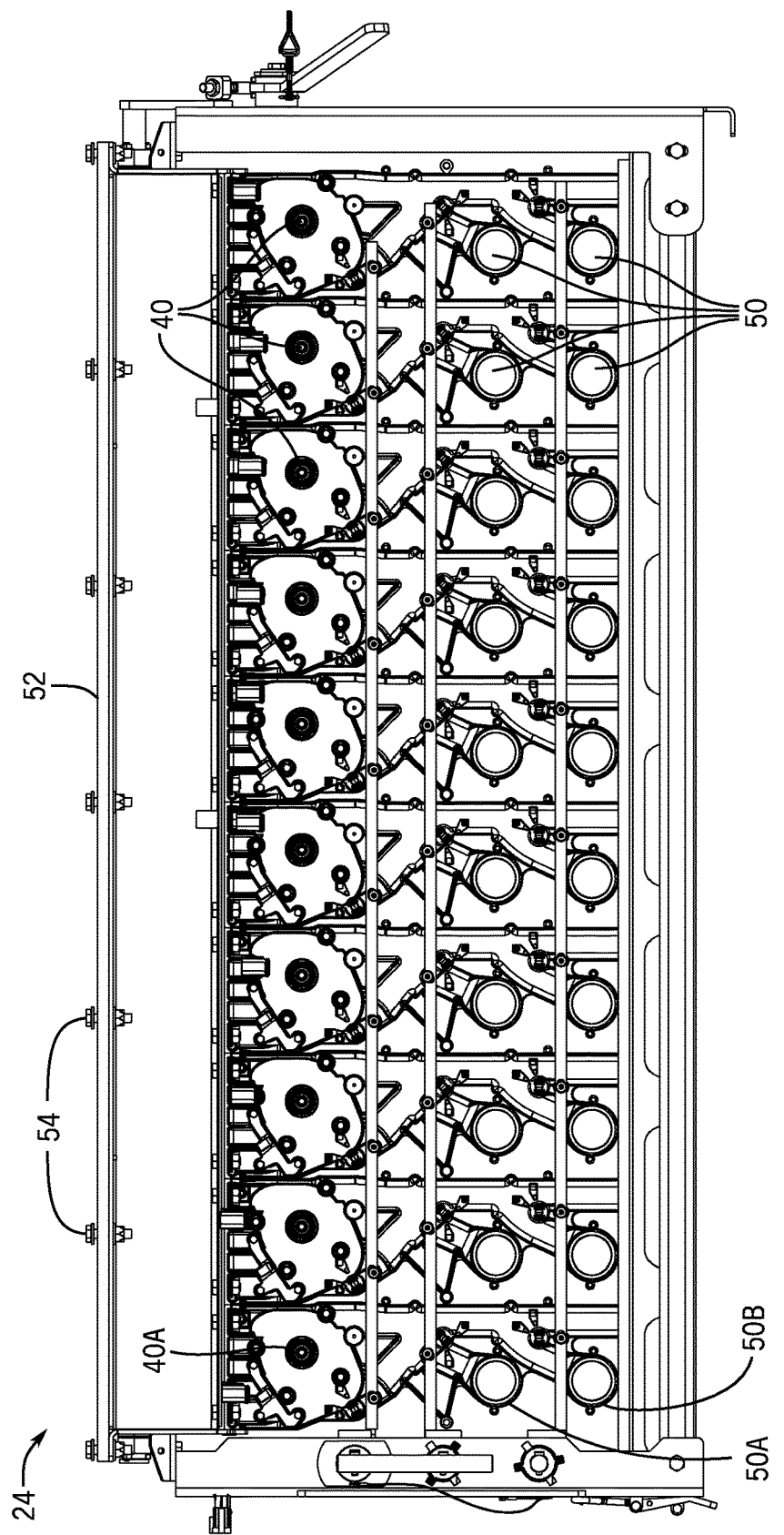
FIG. 3 is a side view of a seed meter, in accordance with an embodiment.

To help illustrate, a side view of one embodiment of a seed meter 24 with ten meter rollers 40 is shown in FIG. 3. In the depicted embodiment, each meter roller 40 may control the seed output rate through the two hose connectors 50 directly below the meter roller 40. For example, a first meter roller 40A may receive seeds from the storage tank 26 and control output of the seeds through a first hose connector 50A and a second hose connector 50B. More specifically, each hose connector 50 may be pneumatically coupled to a respective hose 34 to enable the air stream 36 to be delivered to the distribution header 18 or directly to a ground engaging opener assembly 16. As such, each of the meter rollers 40 may control the seed deposition by one or more ground engaging opener assemblies 16. In other words, the depicted seed meter 24 may be used to deposit ten or more rows of seeds into the soil.

To facilitate receiving seeds from the storage tank 26, the seed meter 24 may be secured to the storage tank 26 using a seed gate assembly 52. For example, in the depicted embodiment, the seed gate assembly 52 is secured to the bottom of the storage tank using bolts 54. Accordingly, seeds may flow from the storage tank 26, though the seed gate assembly 52, and into the seed meter 24. Since the seeds flow through the seed gate assembly 52, the seed gate assembly 52 may be used to control the flow of seeds from the storage tank 26 into the seed meter 24.

Figure 4:
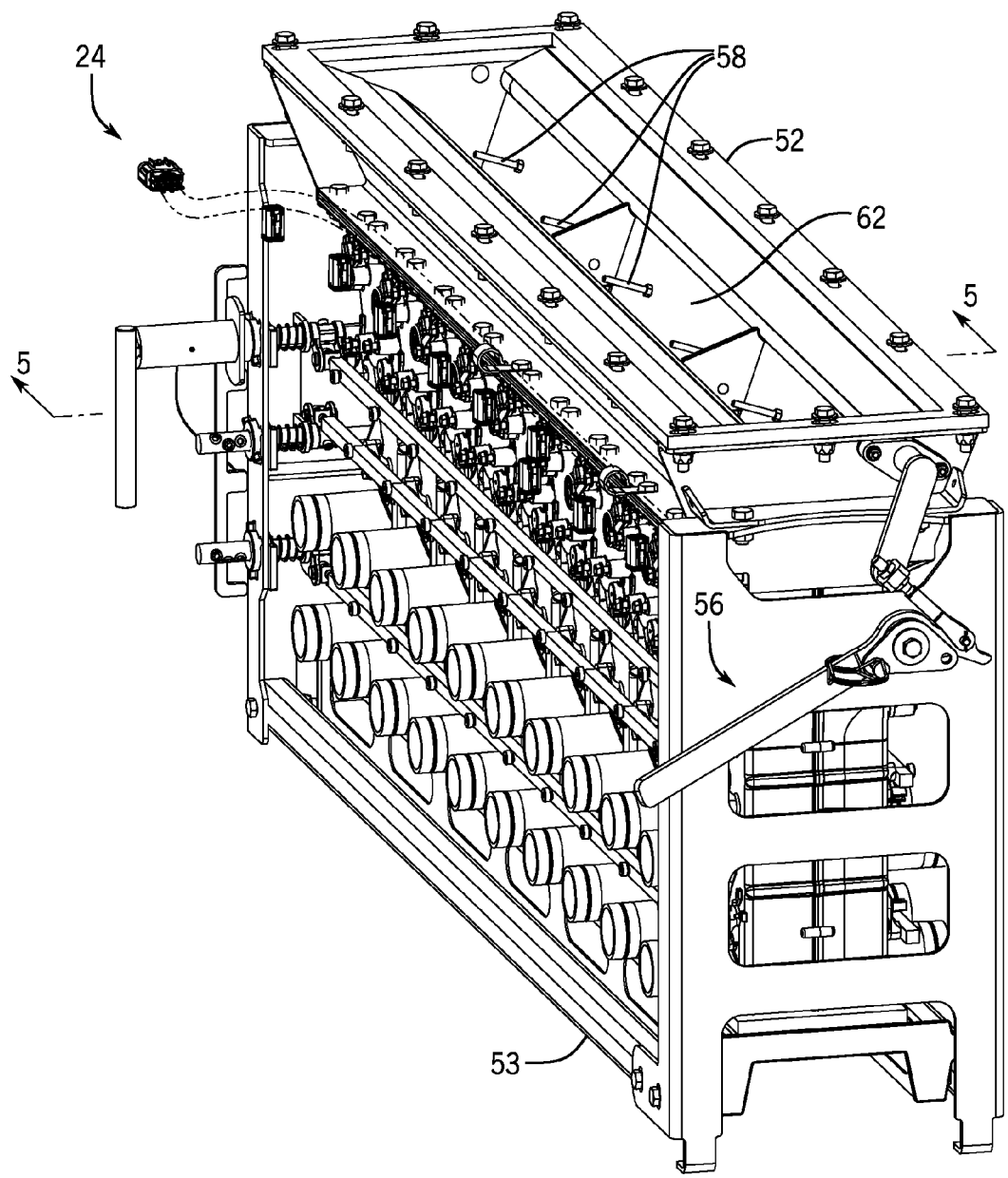
FIG. 4 is a perspective view of the seed meter of FIG. 3, in accordance with an embodiment.

To more clearly illustrate, a perspective view of the seed meter 24 is shown in FIG. 4. In the depicted embodiment, the seed gate assembly 52 is in a closed position. As such, the seed gate assembly 52 blocks the flow of seeds from the storage tank 26 into the seed meter 24. More specifically, in the depicted embodiment, the seed gate assembly 52 may be a single continuous unit that is used to block flow into each of the meter rollers 40. As such, when the seed gate assembly 52 is closed, seeds are blocked from flowing into each of the meter rollers 40.

Additionally or alternatively, multiple seed gate assemblies 52 may be used. For example, a first seed gate assembly 52 may be used to control flow of seeds to five meter rollers 40 and a second seed gate assembly 52 may be used to control flow of seeds to another five meter rollers. As such, the first and second seed gate assemblies 52 may be independently opened or closed to control seed flow to the respective ground engaging opener assemblies 16. As such, multiple seed gate assemblies 52 may be used to provide additional sectional control over the deposition of seed.

As described above, it may be desirable to close the seed gate assembly 52 when maintenance is performed, e.g., to replace a part in the seed meter 24. As can be appreciated, when the seed meter 24 is distributing seeds, seeds may be located throughout the seed meter 24, e.g., in the meter rollers 40 and the hose connectors 50. Accordingly, to provide increased accessibility to components in the seed meter 24, a dropout 53 on the seed meter 24 may be opened to enable seeds already in the seed meter 24 to be expelled. For example, in the depicted embodiment, the dropout 53 is located on the bottom of the seed meter 24 so that when opened gravity may remove the seeds from the seed meter 24. Thus, the seed gate assembly 52 may be closed so that additional seeds from the storage tank 26 may be blocked from entering the seed meter 24. In this manner, accessibility to the seed meter 24 may be improved by removing most of the seeds from the seed meter 24 before maintenance.

On the other hand, when the seed gate assembly 52 is open, seeds may flow from the storage tank 26 into the seed meter 24. As will be described in more detail below, the transition between the open and closed positions may be controlled by a lever 56. For example, the lever 56 may be moved in a clockwise direction to transition the seed gate assembly 52 from the closed position to the open position. Additionally, the lever 56 may be moved in a counterclockwise direction to transition the seed gate assembly 52 from the open position to the closed position. Furthermore, the lever 56 may include a self-locking mechanism to block the seed gate assembly 52 from inadvertently transitioning between the open and closed positions.

Additionally, in the depicted embodiment, the seed gate assembly 52 includes multiple seed agitators 58 disposed along the longitudinal extent of the seed gate assembly 52. More specifically, each seed agitator 58 may extend perpendicularly from a surface of the gate barrier 62. In fact, in some embodiments, the seed agitators 58 may extend into the storage tank 26 as the gate barrier 62 is moved to close the seed gate assembly 52. As such, the seed gate assembly 52 may be transitioned into the closed position to dislodge clumped seeds in the storage tank 26.

Figure 5:
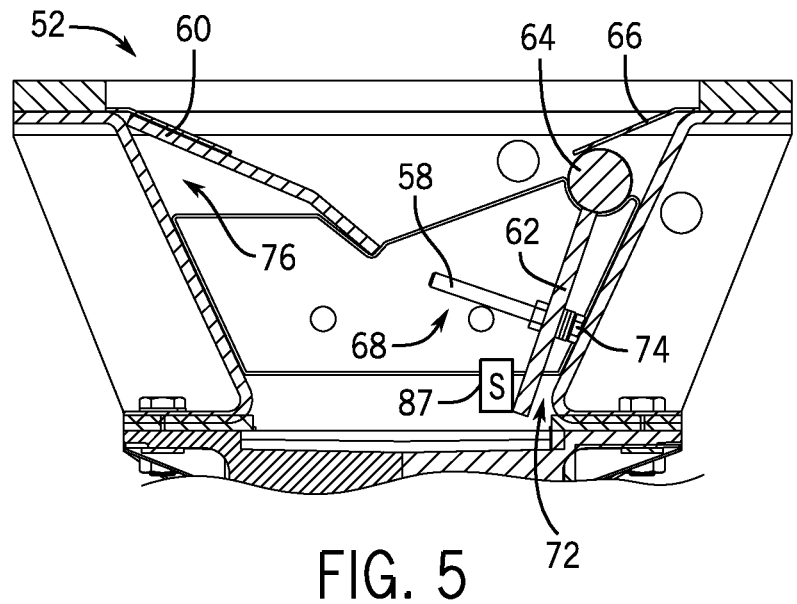
FIG. 5 is a cross-sectional view of a seed gate assembly in an open position, in accordance with an embodiment.
Figure 6:
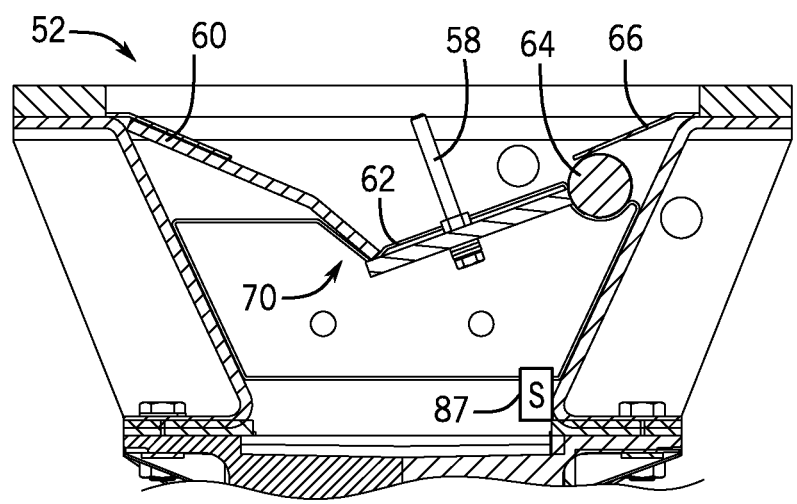
FIG. 6 is a cross-sectional view of the seed gate assembly of FIG. 5 in a closed position, in accordance with an embodiment.

To more clearly illustrate, a cross-sectional view of the seed gate assembly 52 along the 5-5 line of FIG. 4 is shown in FIGS. 5 and 6. More specifically, FIG. 5 shows the seed gate assembly 52 in the open position and the FIG. 6 shows the seed gate assembly 52 in the closed position. In the depicted embodiment, the seed gate assembly 52 includes the seed agitator 58, a main seed deflector 60, a gate barrier 62, a hinge 64, and a hinge seed deflector 66. In the depicted embodiment, the gate barrier 62 may rotate about the hinge 64 to transition the seed gate assembly 52 between the open position and the closed position.

More specifically, as depicted, when the gate barrier 62 is in the open position, a flow path 68 is formed along the main seed deflector 60 and the gate barrier 62, which may enable seeds to flow from the storage tank 26 into the seed meter 24. On the other hand, when the gate barrier 62 is in the closed position, a junction 70 is formed between the main seed deflector 60 and the gate barrier 62, which may block the flow of seeds from the storage tank 26 into the seed meter 24.

Additionally, the likelihood of seed clumping is reduced because the seed deflectors 60 and 66 and the gate barrier guide 62 the seeds in laterally inward direction (e.g., through the flow path 68 and/or toward the junction 70). As depicted, the main seed deflector 60 and the hinge seed deflector 66 are oriented in a downward sloping angle. Furthermore, regardless of whether the seed gate assembly 52 is in the open position or the closed position, the gate barrier 62 also has a downward sloping angle (e.g., changing the degree of the downward sloping angle between the open and closed positions). Accordingly, as gravity pulls the seeds downward, the main seed deflector 60, the hinge seed deflector 66, and the gate barrier 62 may guide the seeds away from the edges of the seed gate assembly 52 and, when the seed gate assembly 52 is open, toward a central portion of the flow path 68 and, when the seed gate assembly is closed, toward the junction 70. In this manner, the likelihood of seeds becoming trapped, for example along the hinge 64, is reduced, which may facilitate cleaning.

In fact, the downward sloping angles of the main seed deflector 60, the hinge seed deflector 66, and the gate barrier 62 may facilitate opening and closing the seed gate assembly 52. As described above, when the seed gate assembly 52 is in the closed position, the seeds may be guided toward the junction 70. In other words, the seeds may be guided toward a location at which the flow path 68 will be formed. Additionally, since the junction 70 is formed at an angle, instead of as a flat surface, the possibility of seed clumping caused by the junction 70 may be reduced. Thus, as the seed gate assembly 52 transitions from the closed position to the open position, un-clumped (e.g., separated) seeds may begin to flow through the flow path 68.

Furthermore, the gate barrier 62 may be formed so that a gap 72 is established behind the gate barrier 62 while the gate barrier 62 is in the fully open position. In the depicted embodiment, the gap 72 may be formed by a nut 74 that is used to couple the seed agitator 58 to the gate barrier 62. Generally, the gap 72 may reduce the possibility of seeds being trapped behind the gate barrier 62. More specifically, as the seed gate assembly 52 transitions from the closed position to the open position, the gap 72 may enable seeds positioned behind the gate barrier 62 to flow downwardly into the seed meter 24. In this manner, the possibility of the gate barrier 62 being blocked from transitioning to the fully open position may be reduced.

On the other hand, as described above, the seeds may be guided toward the flow path 68 while the seed gate assembly 52 is in the open position. As such, a concentration of seeds may be present in and above the flow path 68. However, to close the seed gate assembly 52, seeds in the path of the gate barrier 62 may be displaced. Accordingly, the downward sloping angle of the gate barrier 62 may guide the seeds in the flow path 68 into a gap 76 behind the main seed deflector 76 as the gate barrier 62 closes, which may minimize the torque of on the lever 56 and may minimize seed compression. Additionally, as the gate barrier 62 closes, the seed agitator 58 may displace seeds above the flow path 68. Thus, as the seed gate assembly 52 transitions from the open position to the closed position, the seed flow may be blocked while reducing the possibility of seeds being trapped.

Figure 7:
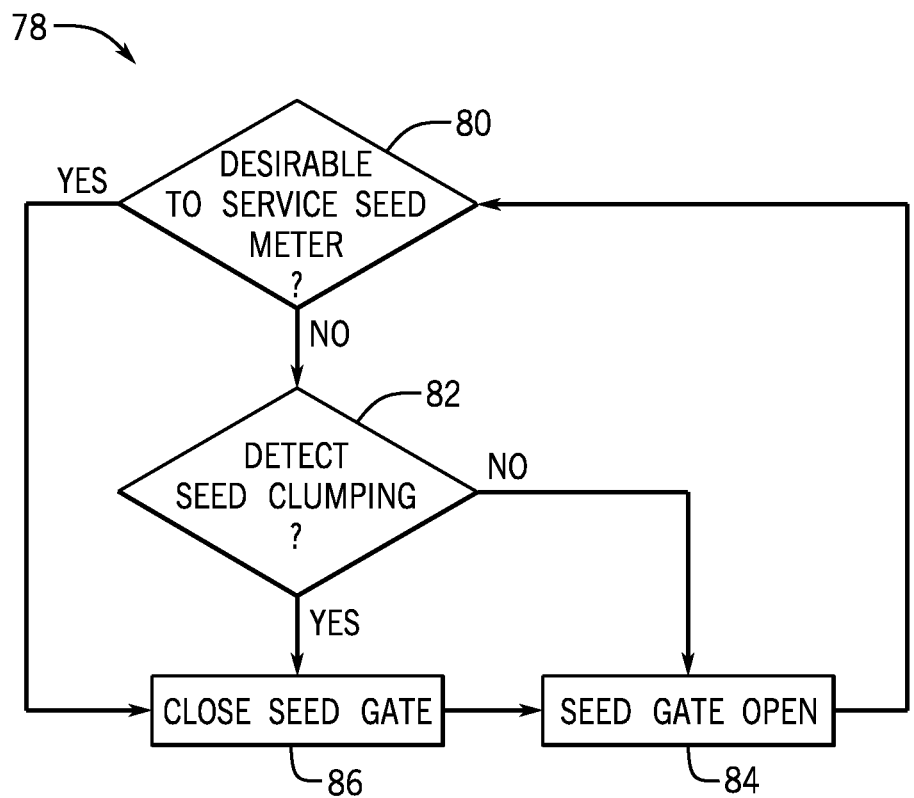
FIG. 7 is a flow diagram of a process for controlling the seed gate assembly, in accordance with an embodiment.

As described above, the seed gate assembly 52 may be transitioned from the open position to the closed position to facilitate performing maintenance. One embodiment of a process 78 for controlling the position of the seed gate assembly 52 is shown in FIG. 7. Generally, the process 78 includes determining whether is it desirable to service the seed meter (decision block 80) and detecting whether clumped seeds are present (decision block 82) visually or with a sensor. When service is not desirable and seed clumping is not detected, the process 78 includes maintaining the seed gate assembly in an open position (process block 84). On the other hand, when service is desirable or clumped seeds are detected, the process 78 includes closing the seed gate assembly (process block 86).

Generally, an operator may determine when it is desirable to service the seed meter 24 (decision block 80). In some embodiments, the operator may determine that service is desirable when the planting system 10 is not operating as expected, e.g., when seeds are unevenly deposited into the soil. Based on the unexpected operation, the operator may then determine whether the cause is related to the seed meter 24, such as a worn meter roller 40. In some embodiments, the operator may be notified of the unexpected behavior by a visual or auditory alarm.

Additionally, the operator may determine whether seed clumping is present in the storage tank 26 (decision block 80). In some embodiments, one or more sensors 87, as shown in FIGS. 5 and 6, may be disposed in the storage tank 26, the seed gate assembly 52, the seed meter 24, or any combination thereof. More specifically, the sensors may be positioned to determine the flow rate of seeds from the storage tank 26 into the seed meter 24. Thus, the operator may determine that clumped seeds are likely present when the flow of seeds is lower than expected. In some embodiments, the operator may be notified of the flow rate with a visual display, or the operator may be notified of possibility of seed clumping with a visual or auditory alarm.

When it is desirable to service the seed meter 24 or seed clumping is detected, the operator may close the seed gate assembly 52 (process block 86). More specifically, closing the seed gate assembly 52 may block additional seeds from entering the seed meter 24. Thus, the seeds remaining in the seed meter 24 may be removed from the seed meter 24. e.g., using the dropout 53, to facilitate access to the seed meter 24. In this manner, the operator may more easily replace parts, diagnose problems, or both.

Additionally, the seed agitators 58 may rotate with the gate barrier 62 as the gate barrier 62 moves toward the closed position. In this manner, the seed agitators 58 may extend into the storage tank 26 and dislodge clumped seeds in the storage tank 26. In fact, the seed gate assembly 52 may be repeatedly moved from the open position, to the closed position, and back to the open position to enable the seed agitators 58 to dislodge tougher seed clumps.

Figure 8:
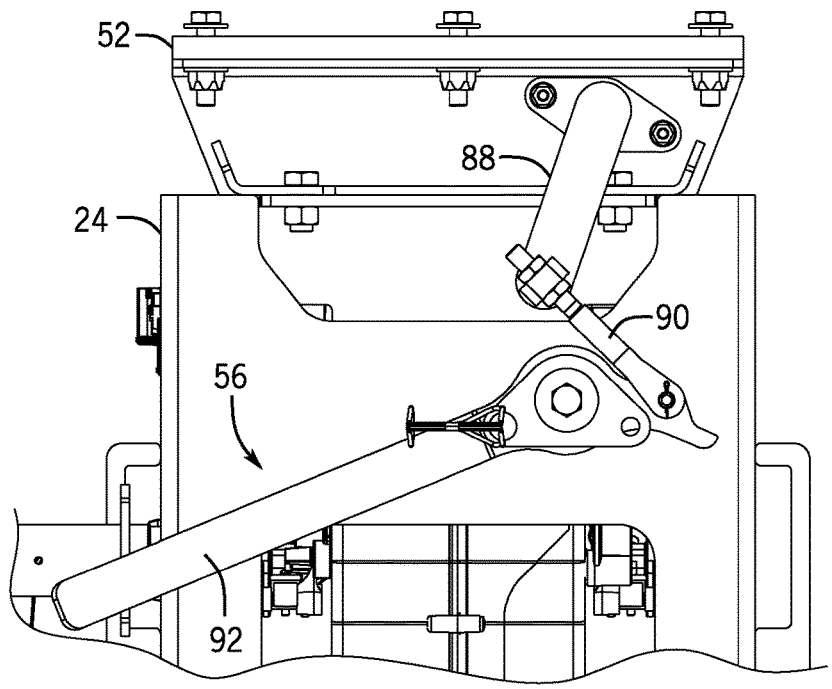
FIG. 8 is a side view of the seed meter of FIG. 3, in which the seed gate assembly is open, in accordance with an embodiment.

As described above, the position of the seed gate assembly 52 may be controlled by a lever 56. More specifically, the lever 56 may be coupled to the gate barrier 62 so that the seed gate assembly 52 may be transitioned between the open position and the closed position by rotating the lever 56. To help illustrate, the seed gate assembly 52 is shown in FIG. 8 in the open position, and the seed gate assembly 52 is shown in the closed position in FIG. 9.

In the depicted embodiment, the lever 56 includes a gate connector 88, a linkage 90, and a handle 92. More specifically, the gate connector 88 may couple the lever 56 to the gate barrier 62. Additionally, the handle 92 may be actuated, e.g., manually actuated by an operator or a drive unit, to control the position of the gate barrier 62. As depicted, the linkage 90 couples the gate connector 88 to the handle 92. In this manner, movement of the handle portion 92 directly controls movement of the gate connector portion 88. For example, in the depicted embodiment, the handle portion 92 may move in a counter-clockwise direction from left to right to close the seed gate assembly 52. On the other hand, the handle portion 92 may move in a clockwise direction from right to left to open the seed gate assembly 52.

As can be appreciated, when the seed gate assembly 52 is closed, the weight of seeds in the storage tank 26 may be placed at least in part on the gate barrier 62. In other words, the seeds may tend to push the seed gate assembly 52 into an open position. However, since an operator may be performing maintenance within the seed meter 24, it would be undesirable for the seed gate assembly 52 to inadvertently open.

Figure 9:
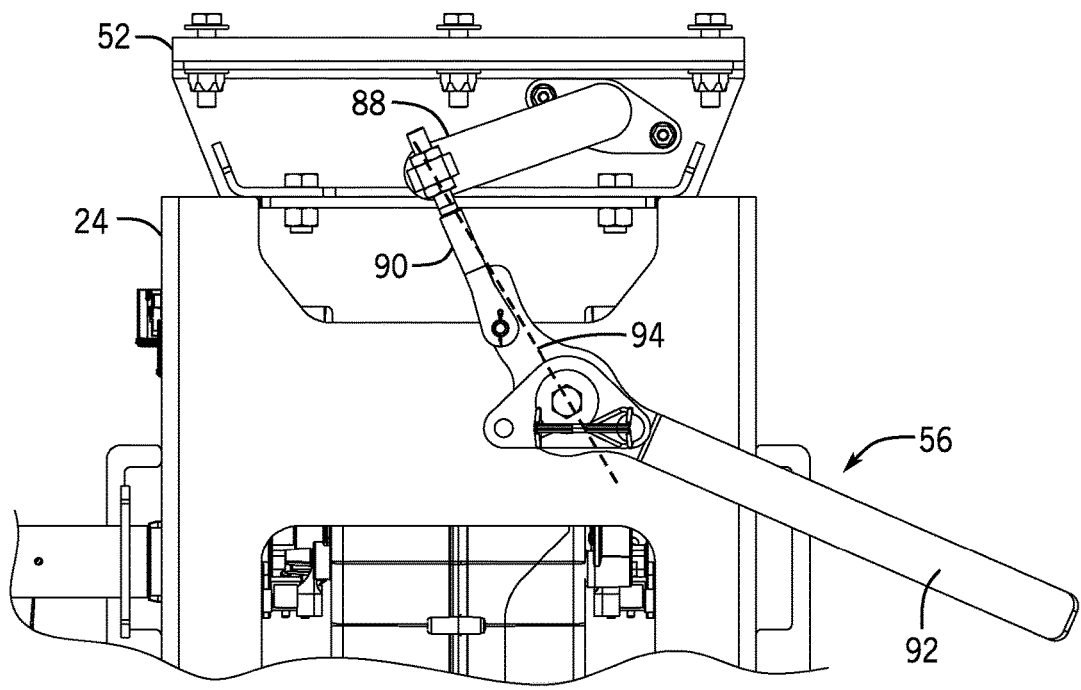
FIG. 9 is a side view of the seed meter of FIG. 3, in which the seed gate assembly is closed, in accordance with an embodiment.

Accordingly, in the depicted embodiment, the lever 56 utilizes a self-locking mechanism. As described above, when the seed gate assembly 52 is transitioned from the open position to the closed position, the linkage portion 90 may rotate between the gate connector 88 and the handle 92. As depicted in FIG. 9, the linkage portion 90 continues to rotate until it is past 180° (e.g., over-center) relative to the gate connector 88 and the handle to self-lock.

To help illustrate, a center line 94 between a pivot of the handle 92 (e.g., a joint between the linkage 90 and the handle 92) and a pivot of the gate connector 88 (e.g., a joint between the linkage 90 and the gate connector 88) is depicted. As depicted, the linkage 90 is rotated past the center line 94. Thus, when the weight of the seeds pushes on the gate barrier 62, the gate connector 88 drives the linkage 90 to exert a downward force, which in turn applies a counter-clockwise torque on the handle 92, thereby urging the handle 92 toward an orientation corresponding to the closed seed gate 52. In this manner, the weight of the seeds may be used to keep the seed gate assembly 52 from inadvertently opening. Additionally, in some embodiments, a pin or bolt may be inserted into the lever 56 to provide extra security against inadvertently transitioning between the open and closed positions, e.g., by locking the handle in a first orientation when the gate barrier is in the open position and locking the handle in a second orientation when the gate barrier is in the closed position.

Accordingly, embodiments described herein may provide the technical benefit of facilitating maintenance operations on the air cart, and particularly the seed meter. More specifically, a seed gate assembly may be used to control seed flow from a seed storage tank to the seed meter. For example, the seed gate assembly may be closed to block the flow of seeds from the storage tank to the seed meter. In some embodiments, a self-locking mechanism may be used to reduce the risk of inadvertently opening from the closed position. Additionally, in some embodiments, the seed gate assembly may include seed agitators formed perpendicularly on a surface of the seed gate assembly. As such, the seed agitators may facilitate dislodging clumped seed when the seed gate assembly is move to the closed position.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A planting system comprising:
    a seed storage tank configured to store seeds before distribution to one or more ground engaging opener assemblies of an agricultural implement;
    a seed meter comprising one or more meter rollers configured to control seed distribution from the seed meter to the one or more ground engaging opener assemblies of the agricultural implement; and
    a seed gate assembly disposed between the seed storage tank and the seed meter, wherein the seed gate assembly comprises:
        a gate barrier configured to control seed flow from the seed storage tank into the seed meter by moving to an open position that enables seed flow from the seed storage tank into the seed meter and by moving to a closed position that blocks seed flow from the seed storage tank into the seed meter; and
        a first seed agitator extending substantially perpendicularly from a surface of the gate barrier, wherein the first seed agitator is configured to extend into the seed storage tank as the gate barrier moves toward the closed position to dislodge clumped seeds in the seed storage tank.

2. The planting system of claim 1, wherein the seed gate assembly comprises a main seed deflector configured to:

form a flow path with the gate barrier that enables seed flow from the seed storage tank into the seed meter while the gate barrier of the seed gate assembly is in the open position; and form a junction with the gate barrier that blocks seed flow from the seed storage tank into the seed meter while the gate barrier of the seed gate assembly is in the closed position.

3. The planting system of claim 2, wherein:

the main seed deflector of the seed gate assembly is oriented at a first downward sloping angle relative to the seed meter;

the gate barrier is configured to be oriented at a second downward sloping angle relative to the seed meter while the gate barrier is in the open position; and the gate barrier is configured to be oriented at a third downward sloping angle relative to the seed meter different from the second downward sloping angle while the gate barrier is in the closed position.

4. The planting system of claim 2, wherein the main seed deflector and the gate barrier of the seed gate assembly are configured to guide seeds toward the flow path while the gate barrier is in the open position and to guide seeds toward the junction while the gate barrier is in the closed position.

5. The planting system of claim 2, wherein the gate barrier of the seed gate assembly is configured to move seeds in the flow path to a region behind the main seed deflector as the gate barrier moves toward the closed position.

6. The planting system of claim 1, wherein the first seed agitator is configured to facilitate movement of the gate barrier toward the closed position by displacing seeds in the seed storage tank.

7. The planting system of claim 1, comprising a second seed agitator extending substantially perpendicularly from the surface of the gate barrier, wherein the second seed agitator is configured to extend into the seed storage tank as the gate barrier moves toward the closed position to dislodge the clumped seeds in the seed storage tank.

8. The planting system of claim 1, wherein the first seed agitator is secured to the surface of the gate barrier by a nut, wherein the nut is configured to establish a gap behind the gate barrier of the seed gate assembly while the gate barrier is in the open position to enable seeds behind the gate barrier to move into the seed meter.

9. The planting system of claim 1, wherein the seed gate assembly comprises:

a hinge coupled to the gate barrier, wherein the gate barrier is configured to rotate about the hinge to move from the open position to the closed position; and a hinge seed deflector positioned above the hinge, wherein the hinge seed deflector is configured to guide seeds from the seed storage tank away from the hinge.

10. The planting system of claim 1, wherein the seed gate assembly comprises a lever coupled to the gate barrier, wherein the lever is configured to move the gate barrier between the open position and the closed position.

11. The planting system of claim 10, wherein the lever comprises:

a gate connector coupled to the gate barrier;

a linkage coupled to the gate connector; and a handle connected to the linkage, wherein the handle is configured to enable an operator to rotate the lever;

wherein the linkage is configured to self-lock the seed gate assembly while the gate barrier is in the closed position by moving to an over-center position relative to the gate connector and the handle.

12. The planting system of claim 1, wherein the gate barrier is configured to:

enable the seed meter to distribute seeds to the one or more engaging opener assemblies of the agricultural implement while the gate barrier is in the open position; and facilitate maintenance on the seed meter while the gate barrier is in the closed position.

13. A seed gate assembly configured to be disposed between a seed storage tank and a seed meter, wherein the seed gate assembly comprises:

a gate barrier configured to control seed flow from the seed storage tank into the seed meter by moving to an open position that enables seed flow from the storage tank into the seed meter and by moving to a closed position that blocks seed flow from the storage tank into the seed meter; and a lever configured to move the gate barrier between the open position and the closed position, wherein the lever comprises:

a gate connector coupled to the gate barrier;

a handle configured to enable actuation of the lever; and a linkage coupled between the gate connector and the handle, wherein the linkage is configured to self-lock the seed gate assembly while the gate barrier is in the closed position by rotating to an over-center position relative to the gate connector and the handle.

14. The seed gate assembly of claim 13, wherein the handle and the linkage are configured to rotate around a first pivot, and the linkage and the gate connector are configured to rotate around a second pivot;

wherein the linkage is configured to rotate to the over-center position by rotating past a center line extending between the first pivot and the second pivot as the gate barrier moves to the closed position.

15. The seed gate assembly of claim 13, wherein the linkage is configured to exert a torque on the handle in a direction that the handle is actuated to move the gate barrier into the closed position.

16. The seed gate assembly of claim 13, comprising a pin configured to lock the handle in a first orientation when the gate barrier is in the open position and to lock the handle in a second orientation when the gate barrier is in the closed position.

* * * * *